United States Patent [19]

Howard

[11] 4,199,060
[45] Apr. 22, 1980

[54] LOCK INSTALLATION KIT

[75] Inventor: Joel A. Howard, Fort Lee, N.J.

[73] Assignee: Howard Hardware Products, Inc., Bloomfield, N.J.

[21] Appl. No.: 926,543

[22] Filed: Jul. 20, 1978

[51] Int. Cl.² ............................................. B65D 71/00
[52] U.S. Cl. .................................. 206/231; 206/471; 206/373; 206/379; 206/372
[58] Field of Search ............... 220/231, 232, 471, 478, 220/372, 373, 379, 349, 461, 462, 45.14, 45.19, 457

[56] References Cited

U.S. PATENT DOCUMENTS 4,056,190  11/1977  Dix .................................. 206/373 X

Primary Examiner—George T. Hall
Attorney, Agent, or Firm—Friedman, Goodman & Teitelbaum

[57] ABSTRACT

A lock installation kit for use in installing, into a door, a dead bolt lock, a lock set with a latch, or other similar types of locks. The kit includes a hole cutter which can drill a hole entirely through a side face of the door, the hole being of a size sufficient to receive therethrough either a doorknob mechanism in the case of a lock set, or a lock cylinder in the case of a dead bolt lock. A template is also included which can be positioned over an edge of the door for locating the hole on the door side face at a predetermined distance from the door edge. In the case of a lock set with a latch, the template also locates the center of the end face of the door, and the kit then includes a wood drill for drilling a hole in the end face of the door of the size sufficient to receive therethrough the latch of the lock set. The hole cutter and template, and also the wood drill in the case of the lock set, together with appropriate instructions, are all combined with a single package.

8 Claims, 7 Drawing Figures

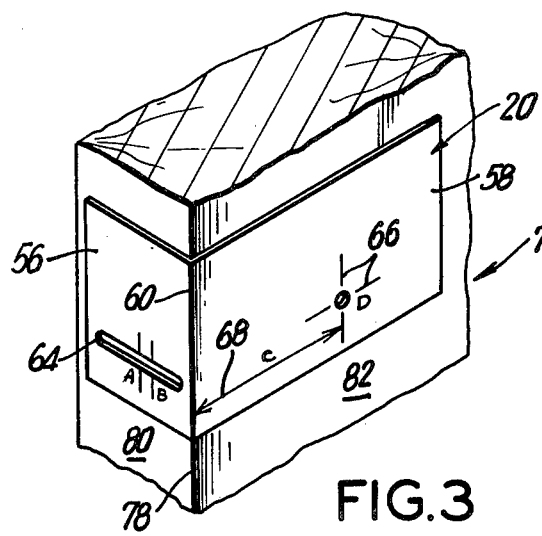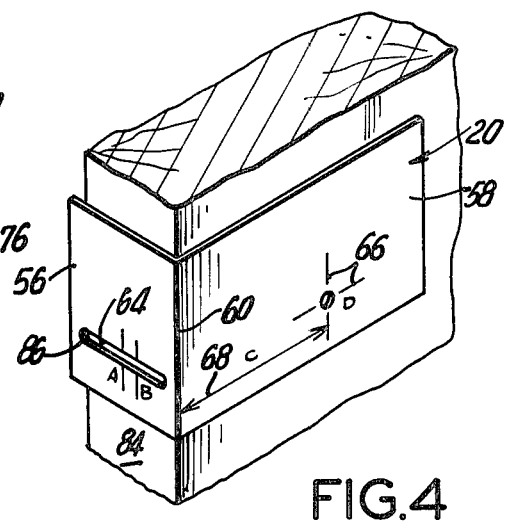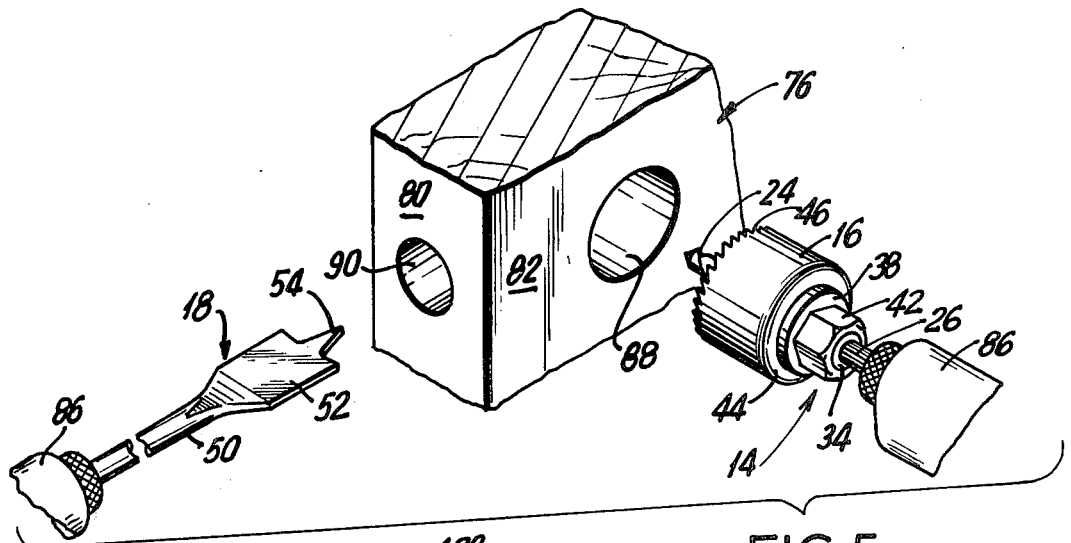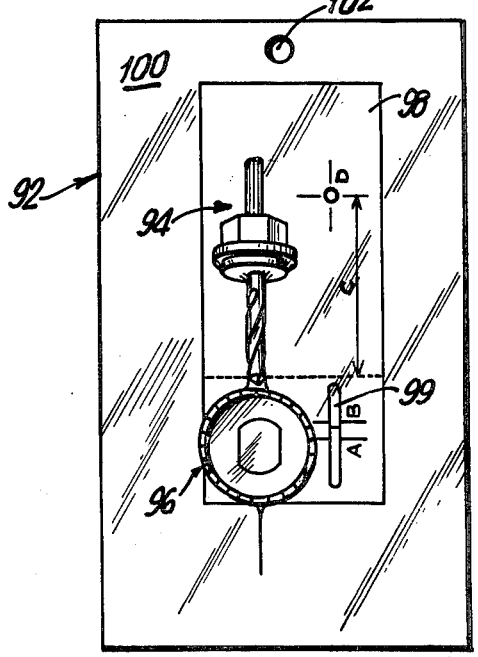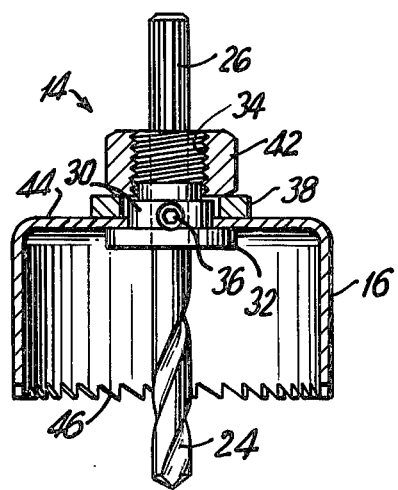

LOCK INSTALLATION KIT

BACKGROUND OF THE INVENTION

This invention relates to a lock installation kit, and more particularly to a unitary packaged kit containing the basic equipment needed for the installation of a lock set, dead bolt lock, or the like.

Installing a lock into a door is generally regarded as a highly skilled task requiring difficult and accurate procedures. In order to install a lock set, appropriate holes must be drilled through the door at exact locations in order to receive the doorknob mechanism, and the positioning of the latch must be accurately measured with respect to the lock. Such accuracy, as is required in the installation of a lock, requires an individual to spend much time in the proper measurements even before beginning the actual installaton thereof. Then, the installation itself is often a difficult task since the proper sized holes must be drilled in order to accommodate the various parts of the lock. Furthermore, different types of locks require different types of requirements for drilling the door. For example, a standard lock set with latch requires the drilling of both the door side face as well as the door end face. On the other hand, a dead bolt lock only requires drilling through the door side face without the latch thereof extending through the inside of the door.

Because of such complex requirements for lock installation, when an individual purchases a door, in most cases he will purchase it with the holes already provided for the lock. Should he not be able to obtain such a predrilled door, he will usually have an expert, such as a locksmith, install the lock since the locksmith will probably be better able to install the lock because of his experience and training.

As a result, because of the complexity involved in lock installation, it is extremely difficult for an individual homeowner or handyman to install a lock himself. Even if the individual has a variety of tools handy, the appropriate measurement and location of the holes makes it difficult to install a lock. Therefore, in most cases, people find it preferably to pay the costs to have an expert install a lock.

SUMMARY OF THE INVENTION

It is accordingly an object of the present invention to provide a lock installation kit which permits the installation of a lock into a door with relative ease and simplicity.

A further object of the present invention is to provide a kit which includes the necessary basic tools for installation, into a door, of a lock set with a latch.

Still a further object of the present invention is to provide a kit for the installation, onto a door, of a dead bolt lock.

A further object of the present invention is to provide a single packaged unit containing the necessary equipment for the installation of a lock on a door.

Briefly, the present invention provides a lock installation kit which includes a hole cutting device which can drill a hole entirely through a door side face, the hold being of a size sufficient to receive therethrough a door lock. There is also included a template for positioning over an edge of the door. The template provides easy location of the center point of the door lock hole at a predetermined distance from the door edge, through which the hole cutting device can cut the necessary hole.

The kit items are contained in a single package, together with instructions. These items are sufficient to install a dead bolt lock. In the case of a lock set with a latch, the package would additionally include a wood drill for drilling a hole into the end face of the door of a size sufficient to receive therethrough the latch of the door lock. The template would also be utilized for locating the center of the end face of the door through which the latch hole is drilled. The template locates the centers of both holes along a common horizontal plane.

BRIEF DESCRIPTION OF THE DRAWINGS

With the above and additional objects and advantages in view, as will be hereinafter appear, this invention comprises the devices, combinations and arrangements of parts hereinafter described by way of example and illustrated in the accompanying drawings of a preferred embodiment in which:

FIGS. 3 and 4 show isometric views of the use of the template on doors of various thicknesses;

FIG. 5 is an isometric view illustrating various parts of the kit being used for making the necessary holes for the installation of a lock set with a latch;

FIG. 6 is a front view of a packaged installation kit for a dead bolt lock; and

FIG. 7 is a sectional elevational view through the assembled hole cutting device of the present invention.

In the various figures of the drawings, like reference characters designate like parts.

DETAILED DESCRIPTION OF THE PREFERRED EMBODIMENT

Figure 1:
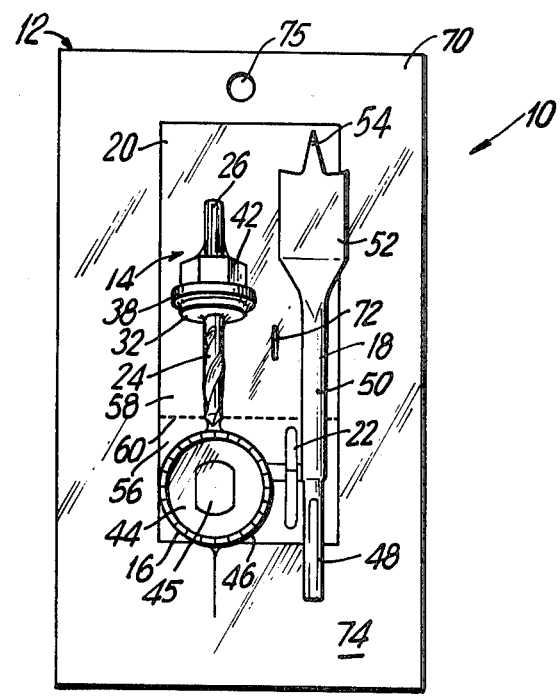
FIG. 1 is a front view of the lock installation kit containing the various parts needed for installing a lock set with a latch, being arranged in a single package in accordance with the present invention.
Figure 2:
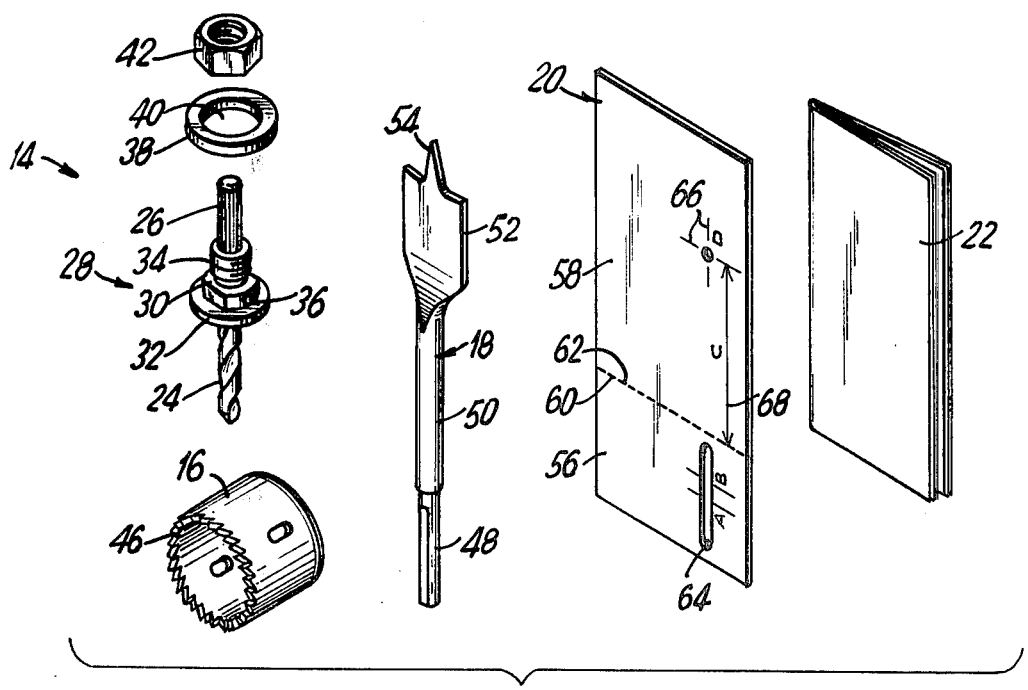
FIG. 2 shows an exploded view of the various parts contained within the package shown in FIG. 1.

Referring now to FIGS. 1 and 2, there is generally shown a lock installation kit 10, comprising a single package, shown generally at 12, which includes a mandrel assembly 14, a hole saw 16, a wood drill 18, a template 20, and a set of instructions 22.

As can best be seen in FIG. 2, the mandrel assembly includes a pilot drill shown as twist drill 24, having a shank portion 26 which can be inserted into a conventional electric drill. Mounted onto the pilot drill is a coupling arrangement, shown generally as 28, for supporting the hole saw 16 and preventing rotation of the hole saw with respect to the pilot drill. The coupling arrangement includes a flat sided mount 30, better known as a double-D boss, having an enlarged circular base portion 32. Upwardly extending from the boss 30 is a threaded neck portion 34. The mounting arrangement 28 is securely fastened to the twist drill 24 at approximately the center thereof by means of the socket screw 36. The mandrel assembly also comprises a washer 38 having an inside opening 40. The washer is of a size so that it can fit around the double-D boss 30 and sit on the enlarged base portion 32 when in the package arrangement. A hex nut 42 is provided for threading onto the neck portion 34 and tightening down onto the boss 30 for holding the washer 38 in place in the package arrangement, where the washer 38 is disposed around the boss 30 when positioned on the base 32 and is held between the base 32 and the hex nut 42, as shown in FIG. 1.

The hole saw 16 comprises a cylindrical member having an end wall 44 in which is formed a flat sided or double-D opening 45 of a size that will fit over and matingly receive the double-D boss 30 on the coupling arrangement. The other end of the hole saw 16 is formed with a saw tooth 46.

The wood drill 18 is of a standard type having a shank portion 48 which fits into an electric drill, and including a shaft 50 which terminates into a flat spade 52 having a pointed arrowhead 54.

The template 20 can typically be formed of a single sheet of cardboard of substantially rectangular shape and including a first section 56 separate from a larger second section 58 by a fold line 60. The fold line 60 can be scored to provide easy bending of the two sections 56, 58. The fold line is identified by means of the dotted lines 62. On the first section 56 is provided an elongated slot 64 having a first identifying mark transversely crossing the slot and identified as point A, and a second identifying mark crossing the slot identified as point B. The second secton 58 includes a hole D identified by means of the cross hairs 66 and which is spaced a distance C from the fold line 60 as shown by arrow 68.

The instructions 22 can be folded into a size slightly smaller than the size of the template so as to fit inside the package and beneath the template 50 as to be covered thereby.

The package containing all of the described parts can be formed of a cardboard backing sheet 70, with the template and instructions therebeneath stapled to the sheet 70 by means of a staple 72. The other parts are placed over the template and are held in place by means of a plastic bubble package 74. Preferably, a hole 75 extends through the plastic material and the sheet 70 so that the package can be hung on a conventional hook or wire for display thereof.

In utilizing the heretofore described lock installation kit in connection with the installation of a lock set with a latch, the additional equipment that is needed would include a conventional electric drill, some conventional screwdrivers, a conventional chisel, a conventional hammer, and conventional twist drills.

Referring now to FIGS. 3-5 there will be described the use of the installation kit in installing a lock set with a latch onto a wooden door 76.

First, the height from the bottom of the door is measured. Existing locks on other doors can be used as a guide. Typically, the height of the lock from the floor is approximately 38 inches. The template 20 is bent along its fold line 60 and then placed around the edge 78 of the door 76 so that the first section 56 of the template is placed over the end face 80 of the door, and the second section 58 of the template is placed over the side face 82 of the door.

With the template positioned at the desired height, the center point D is marked off onto the side face 82 of the door to identify the center point of the installation of the knob, referred to as the backset. The template is also utilized to find the center of the end face 80 of the door. It should be noted, that two identifying marks, A and B, are provided for such identification. Typically, the thickness of the door will be in one of two sizes. As a result, two identifying marks are needed, mark A for the larger size and the other mark B for the smaller size.

In order to be sure that the proper identification letter is utilized, the elongated slot is provided to see where the end of the door is. As shown in FIG. 3, the door is of a length so that the complete slot is placed on the door itself. In such situations, the identification mark A is utilized for locating the center of the end face of the thicker door, which is marked off accordingly. With reference now to FIG. 4, it will be noted that the end face 84 of another door is of a thinner size, so that the template section 56 does not cover the entire door and a portion of the door end face 84 is visable through the elongated slot 64, as shown at the point 86. In this situation, the mark B is utilized for locating the center of the end face of the thinner door, which is marked off accordingly.

The hole saw 16 is then assembled to the mandrel assembly 14. This is achieved by removing the hex nut 42 and washer 38 from the mandrel assembly. The shank portion 26 is inserted through the opening 45 of the hole saw. The hole saw 16 is then placed over the base portion 32 of the coupling arrangement 28 with its teeth facing toward the bit end of the drill bit 24. The double-D opening 45 is appropriately positioned onto the double-D boss 30 so that the boss 30 protrudes through the end face 44 of the hole saw 16 and the hole saw is prevented from rotation with respect to the pilot drill 24. The washer 38 is then replaced around the double-D boss 30 so that it is flush with the end face 44 of the hole saw 16. It should be noted that the thickness of the washer 38 is such, that when positioned on the hole saw, it is approximately the same or slightly above the height of the double-D boss 30, as shown in FIG. 7. The hex nut 42 is then placed on the threaded neck portion 34, and is tightened securely against the washer 38 so that the end face 44 of the hole saw 16 is held securely sandwiched between the washer 38 and the base portion 32 of the coupling arrangement 28, while the boss 30 prevents relative rotation therebetween.

With the hole saw 16 connected to the mandrel assembly 14, the shank 26 of the pilot drill 24 is inserted into a conventional electric drill 86, and utilized to drill a hole 88 having its center corresponding to the center point D. The hole 88 is drilled through the side face 82 of the door 76 for the lock set, as shown in FIG. 5.

The wood drill 18 is then inserted into the electric drill 86, replacing the hole saw 16 and mandrel assembly 14. The latch hole 90 is now drilled into the end face 80 of the door 76, as shown in FIG. 5. This hole 90 should meet the lock set hole 88 and continue therepast for approximately ¾ inch. If desired, the lock set hole 88 and the latch hole 90 can be initially drilled with pilot holes to facilitate the drilling operation.

The latch is then inserted through the latch hole 90. The area around the latch can be marked off and chiseled out to make a conventional latch plate opening so that the latch plate will be flush with the end face of the door. The latch is then screwed into its proper position. The outside knob together with its rosette plate is then mounted on the door 76 by inserting the spindles thereof into the hole 88 in the side face 82 and through the latch or engaging the lock tongue in the latch groove in a conventional manner. The opposite inside knob together with its rosette plate is then positioned in a conventional manner on the spindles of the outside knob which protrude out of the hole 88. After aligning the screw stems, the two knobs are then screwed together in a conventional manner.

To complete the installation, the height from the floor to the center of the latch is then measured and this distance is marked on the door jamb, not shown. The distance from the door edge to the center of the latch is also measured and marked onto the door jamb. The striker plate is then placed over this mark, and the opening therein is marked. The wood drill 18 is then utilized to drill a shallow hole into the door jamb corresponding to the striker plate opening. The striker plate is again placed and the outer peripheral edge is marked on the door jamb. This area is chiseled out so that the striker plate will be flush with the door jamb. The striker plate is then inserted and screwed onto the door jamb in a conventional manner, and the installation is now complete.

For standard lock sets, the distance C on the template is $2\frac{3}{8}"$. This is also the same standard size for dead bolt locks and most other lock types. Also, door thicknesses are generally $1\frac{3}{8}"$ or $1\frac{3}{4}"$ and, accordingly, the distances A and B can be appropriately set for the centers of such doors. The size of the hole saw 16 will vary depending upon the size of the lock. Typically, such lock sets are in sizes of $1\frac{1}{4}$ inches, $1\frac{1}{2}$ inches, $2\frac{1}{8}$ inches, etc. and the size of such hole saws can be made to accommodate the particular kind of lock sets. Typical latches are $\frac{7}{8}$ inches and, accordingly, the size of the wood drill would be a $\frac{7}{8}"$ wood drill. However, for those locks with 1" latches, a 1 inch wood drill can be utilized.

It will be noted, as shown in FIG. 7, that the pilot drill 24 extends downwardly from the hole saw 16 so that initially the pilot drill enters into the wood followed by the hole saw. If the pilot drill 24 dulls or is broken, it can be replaced by loosening the socket screw 36 provided on the double-D boss 30. Generally, this can be achieved by means of an Allen wrench, where the old bit can be removed and replaced with a new one.

Referring now to FIG. 6, there is shown an alternate embodiment which can be utilized for a dead bolt lock. In such kits, there is again provided a package 92 including a mandrel assembly 94 and a hole saw 96. There is also a template 98 and instructions 99 beneath the template. The entire package is covered by means of a plastic bubble 100, and provided with a hole 102 for hanging the package on a hood for display thereof. It should be noted that in this case, there is no wood drill provided, since there is no latch that goes through the door on a dead bolt lock.

Utilizing the kit shown in FIG. 6, in order to install a dead bolt lock, the template is first folded on its appropriate fold line and placed over the edge of the door. The center point D is marked on the side face of the door to locate the lock cylinder. Using the hole saw, a hole is drilled through the center point D in order to accommodate the lock cylinder. Four screw holes are also measured and drilled on the door face, with the holes extending partially through the door, in order to receive the deadlock itself in a conventional manner.

The cylinder is inserted with the keyhole at the bottom thereof. If there is a back, it is attached to the cylinder. The cylinder connector bar is broken off about $\frac{3}{8}"$ beyond the door. The lock is placed on the door, sliding it over the cylinder connecting bar. The lock is then screwed to the door. The striker is attached to the door jamb and aligned with the lock in a conventional manner. If necessary it can be morticed to the jamb.

Utilizing the lock installation kit as described, the installation of either a lock set with latch, or a dead bolt lock, or the like, can be easily installed onto a door. The positioning of the various parts of the lock is facilitated by means of the template and by means of the hole saw, mandrel and wood drill. All of the necessary holes can be easily made with precision.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A lock installation kit comprising:
    template means for positioning over an edge of a door for locating a center point of a door lock hole of a side face of the door at a predetermined distance from the door edge;
    said template means including an elongated flat member having first and second sections foldable along a fold line therebetween to assume positions at right angles with each other thereby enabling positioning of said template over the edge of the door with said first section being disposed on the door side face and said second section being disposed on an end face of the door, said first section being longer than said second section, said first section having a single hole located at said predetermined distance when said fold line is disposed on the edge of the door;
    hole cutting means for drilling the door lock hole entirely through the door side face, said door lock hole being of a size sufficient to receive therethrough a door lock;
    said hole cutting means including a mandrel assembly having a shank portion capable of insertion into an electric drill, and a hole saw removably coupled to said shank portion;
    said shank portion of said mandrel assembly being part of a pilot drill for inserting into said single hole in said first section of said flat member;
    said mandrel assembly including a coupling arrangement secured to said shank portion of said pilot drill for supporting said hole saw and preventing rotation of said hole saw with respect to said pilot drill, and a locking member for securing said hole saw to said coupling arrangement; and
    packaging means for containing together said hole cutting means and said template means to provide a unitary container.

2. A lock installation kit as in claim 1, wherein said coupling arrangement comprises a double-D boss having an enlarged circular base and a threaded neck portion, a socket screw securing said coupling arrangement to said shank portion of said pilot drill, said hole saw having a double-D opening to accommodate said double-D boss, and said locking member being a nut threaded onto said threaded neck portion.

3. A lock installation kit as in claim 2, and further comprising a washer positioned around said double-D boss and against said hole saw, said nut being threaded on said neck portion against said washer to sandwich and securely retain said hole saw between said washer and said enlarged circular base of said coupling arrangement.

4. A lock installation kit as in claim 1, and further comprising a wood drill for drilling a latch hole into the end face of the door, said latch hole being of a size sufficient to receive therethrough a latch of the door lock.

5. A lock installation kit as in claim 4, wherein said template means also locates a center of the end face of the door along a common horizontal plane with said center point of the door lock hole.

6. A lock installation kit as in claim 5, wherein said second section of said flat member has identifying means for locating the center of said door end face.

7. A lock installation kit as in claim 1, and further comprising an instruction sheet on how to use said hole cutting means and said template means for installing the door lock in the door.

8. A lock installation kit as in claim 6, wherein said identifying means of said second section includes an elongated slot with at least two identifying marks, each of said two marks respectively identifying the center of a end face of a different thickness.

* * * * *